United States Patent [19]
Levin et al.

[11] 4,151,855
[45] May 1, 1979

[54] BALL VALVE ASSEMBLY TOOLS AND METHOD OF USING SAME

[75] Inventors: Alan R. Levin; George A. Moran, both of Houston, Tex.

[73] Assignee: ACF Industries, Incorporated, New York, N.Y.

[21] Appl. No.: 802,744

[22] Filed: Jun. 2, 1977

[51] Int. Cl. ............................ F16k 43/00; F16k 51/00
[52] U.S. Cl. ...................................... 137/15; 137/315; 137/316; 251/315; 251/159; 251/174
[58] Field of Search ......................... 137/15, 315, 316; 251/159, 174, 315, 316, 62; 92/52

[56] References Cited

U.S. PATENT DOCUMENTS

| | | | |
|---|---|---|---|
| 2,667,035 | 1/1954 | Marsden | 92/52 |
| 3,114,386 | 12/1963 | Damm | 137/316 |
| 3,171,429 | 3/1965 | Stürmer et al. | 251/159 |
| 3,542,054 | 11/1970 | Works | 251/315 |
| 3,771,545 | 11/1973 | Allen | 137/315 |
| 3,883,112 | 5/1975 | Milleville et al. | 251/315 |

FOREIGN PATENT DOCUMENTS

| | | | |
|---|---|---|---|
| 2325112 | 12/1974 | Fed. Rep. of Germany | 251/315 |
| 1215159 | 12/1970 | United Kingdom | 137/316 |

Primary Examiner—Martin P. Schwadron
Assistant Examiner—G. L. Walton
Attorney, Agent, or Firm—Eugene N. Riddle

[57] ABSTRACT

The valve assembly tools include a longitudinally expandable member insertable between the seats in a ball valve to forcefully displace the seats into a retracted position in the seat pockets. Seat securing devices are temporarily mounted in the valve body through seat lubrication apertures so they can temporarily engage each of the seat assemblies to secure them in the retracted position. When assembling a valve the seats are displaced to the retracted position by using the longitudinally expandable member and they are temporarily retained in this position by the seat securing devices so the expandable member can be removed. Next the ball valve member is positioned between the seats and then the seat securing devices are released to allow the seats to move into contact with the ball valve member. The seat securing devices are then removed from the valve body and assembly of the valve is continued.

11 Claims, 12 Drawing Figures

BALL VALVE ASSEMBLY TOOLS AND METHOD OF USING SAME

BACKGROUND OF THE INVENTION

This invention is related to tools for assembling a valve and a method of assembling a valve. More particularly, the apparatus portion of this invention is related to tools used in the assembly of ball or spherical plug type valves which have the valve member placed in the body of the valve through an oppropriate opening in the top or bottom of the valve body.

In regard to prior art, it is first helpful to consider the problems involved in assembling a so called top entry or bottom entry ball valve. In either of these styles the valve body has an opening through the top or the bottom thereof to receive the valve member. The seats are situated in recesses or seat pockets around the inlet and outlet fluid passageways and they are biased toward the valve member. Because of the spherical valve member surface, the seats overlap a portion of the ball valve member so a seal portion of the seat rests in surface-to-surface contact with the ball member. The basic problem in assembling such a valve is to retain the seat members in a retracted position in the seat pockets so the ball valve member can be placed into the valve body cavity between the seat members so they are not damaged by entry of the valve member. In the prior art it is quite common for a valve manufacturer to use seat retracting tools to retract the seat members to provide for insertion of the ball valve member. These seat retracting tools are placed in the passageways and attached to the seats. Generally this method of assembly is adequate for manufacture, however, it is not practical for servicing a valve in use where the valve is mounted in a flowline because of the inaccessibility of the inlet and outlet passageways.

Another apparatus for assembling such valves is shown in U.S. Pat. No. 3,114,386 to R. P. Dumm entitled "Manual Latch to Retract a Packing Assembly". In this patent a hole is provided inside the valve body cavity underneath a trunnion bearing support for the valve member so that when the valve is disassembled with the bonnet and the trunnion bearing supports removed then a latch pin can be inserted through the hole into a groove around the seat member. In the apparatus shown in this patent, the seat members must be displaced to the retracted position by hand then the latch pin inserted through the hole into a groove around the seat member. Once both of the seat members have been moved to the retracted position and secured by the latch pin, then the valve member can be inserted into the valve body cavity. While the use of hand force to move the seats to a retracted position is suitable under some circumstances, it is obviously not suitable or acceptable for valves where high spring forces or biasing forces are used on the seat members to urge them into contact with the valve member. In general for valves of a two (2) inch diameter and larger designed for working pressures of about one hundred (100) pounds per square inch and above pressure, it is difficult, if not impossible, to displace the seats by hand because of the large seat spring forces involved. It is quite common for valves with this general type of construction to be made in sizes from about one (1) inch in bore diameter to approximately sixteen (16) inches in bore diameter. Obviously, the apparatus shown in the Dumm patent is useful only in a very limited number of valves and because of the high spring pressures is not adapted for use with large valves.

SUMMARY OF THE INVENTION

An embodiment of the assembly tools includes a longitudinally expandable member with opposite end portions thereof engageable with facing end portions of the respective seat assemblies in a top entry valve. The longitudinally expandable member is operable to displace individual seat members to a retracted position in their respective seat pockets against the bias of any springlike element in the seat assemblies. The assembly tools further include a pair of seat retaining tools which are temporarily mountable with the valve body through valve seat lubricant openings in the valve body. The valve seat lubricant fittings are mounted on a valve body at these openings to provide for external seat lubrication or emergency sealant injection from the exterior of the valve body directly to the seats.

An embodiment of the longitudinally expandable member is a telescopic piston and cylinder apparatus. In another embodiment the longitudinally expandable member is a linkage mechanism actuated by a rotatably mounted threaded member. In another embodiment, the longitudinally expandable member is a linkage mechanism actuated by hand movement of a pair of levers. In another further embodiment, the longitudinally expandable member has a bladder which is fillable to displace the seat members and vented to contact the member for removal from the valve.

The associated method of this invention utilizes the above described apparatus and includes inserting the longitudinally expandable member into the valve body cavity between the seat members and displacing the seat members to the retracted position, securing the seat members in the retracted position, then removing the tool and inserting the ball valve member.

One object of this invention is to provide valve assembly tools and method of assembling a valve which overcomes the aforementioned disadvantages of the prior art devices and which provides a tool that can be used for manufacturing of a valve as well as in-line repairing of a valve.

Another object of this invention is to provide valve assembly tools which can be utilized for rapid assembly of a valve in a manufacturing environment and in a field service environment.

A further object of this invention is to provide a method of assembling a top entry ball valve which provides maximum safety for the person assembling the valve during manufacturing as well as field service.

Various other objects, advantages, and features of this invention will become apparent to those skilled in the art from the following discussion, taken in conjunction with the accompanying drawings, in which:

The following is a discussion and description of preferred specific embodiments of the ball valve assembly tools and method of using same, such being made with reference to the drawings, whereupon the same reference numerals are used to indicate the same or similar parts and/or structure. It is to be understood that such discussion and description is not to unduly limit the scope of the invention.

DETAILED DESCRIPTION

Figures 5, 10, 11, 12:
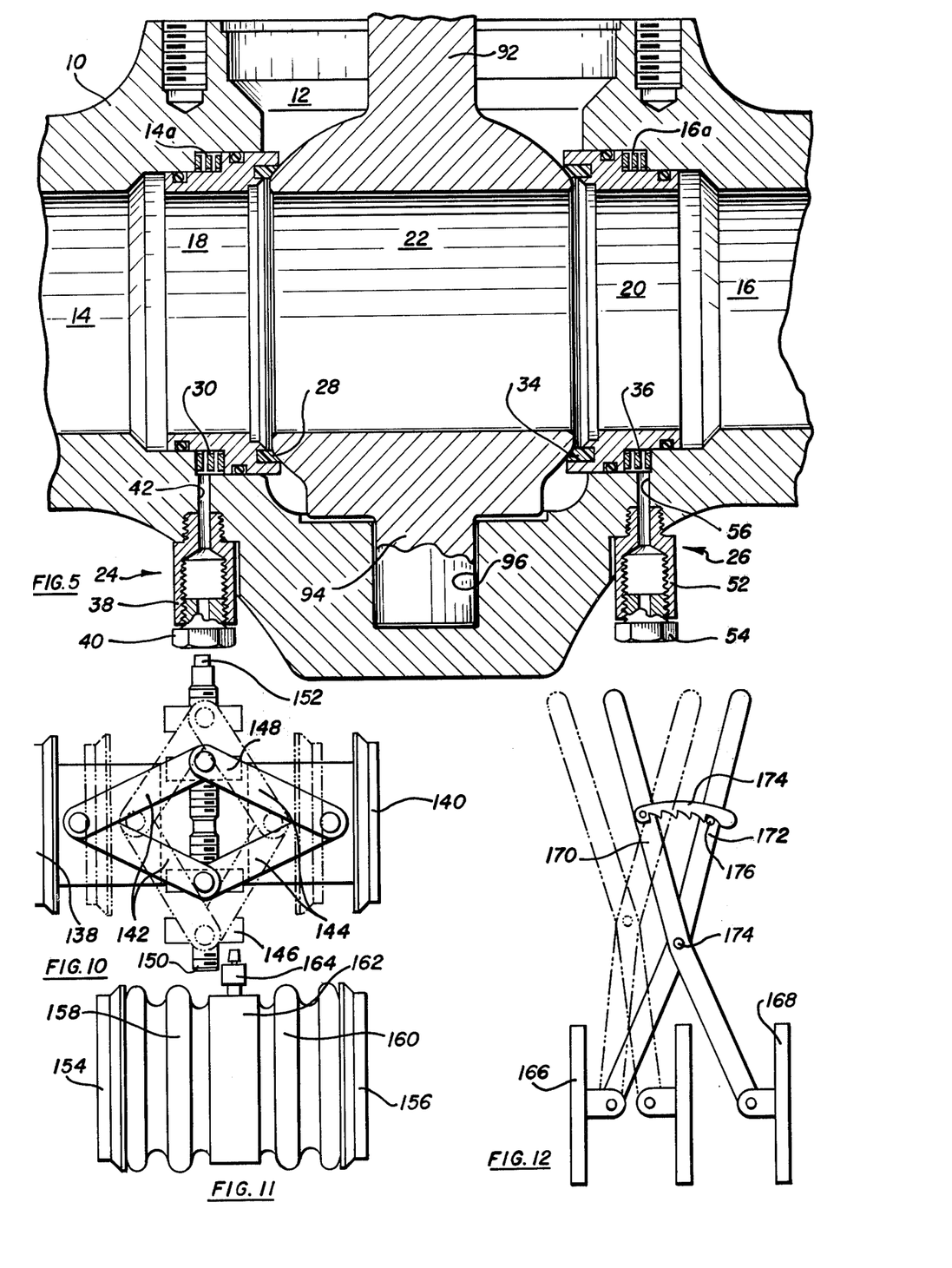
FIG. 5 is a cross-sectional elevation view of the valve as shown in FIG. 1 with the seat members in place contacting the ball valve member and with lubricant injector couplings mounted in the lubricant fittings.
FIG. 10 is an elevation view of an alternate longitudinally expandable member employing a linkage mechanism actuated by rotary motion shown in an extended position in solid lines and in a retracted position in dashed lines.
FIG. 11 is an elevation view of an alternate longitudinally expandable member wherein such has a bladder construction.
FIG. 12 is an elevation view of an alternate longitudinally expandable member which includes a linkage mechanism that is hand actuated by levers.

A top entry valve of the type assembled by using the tools and method of the invention is shown in a substantially completed form in FIG. 5. The top entry valve includes a valve body 10 which has a valve chamber 12 therein with inlet and outlet passageways 14 and 16 respectively therethrough in fluid communication with the valve chamber. The inlet and outlet passageways 14 and 16 each respectively have recesses or seat pockets 14A and 16A in which seat assemblies 18 and 20 are mounted. A spherical or ball type valve member 22 is mounted in valve chamber 12 between face portions of the seat assemblies 18 and 20. The valve has seat lubrication and sealant openings which communicate from the exterior of the valve to seat assembly 18 and 20. Lubrication and sealant injection fittings 24 and 26 are shown mounted with these openings.

Figure 1:
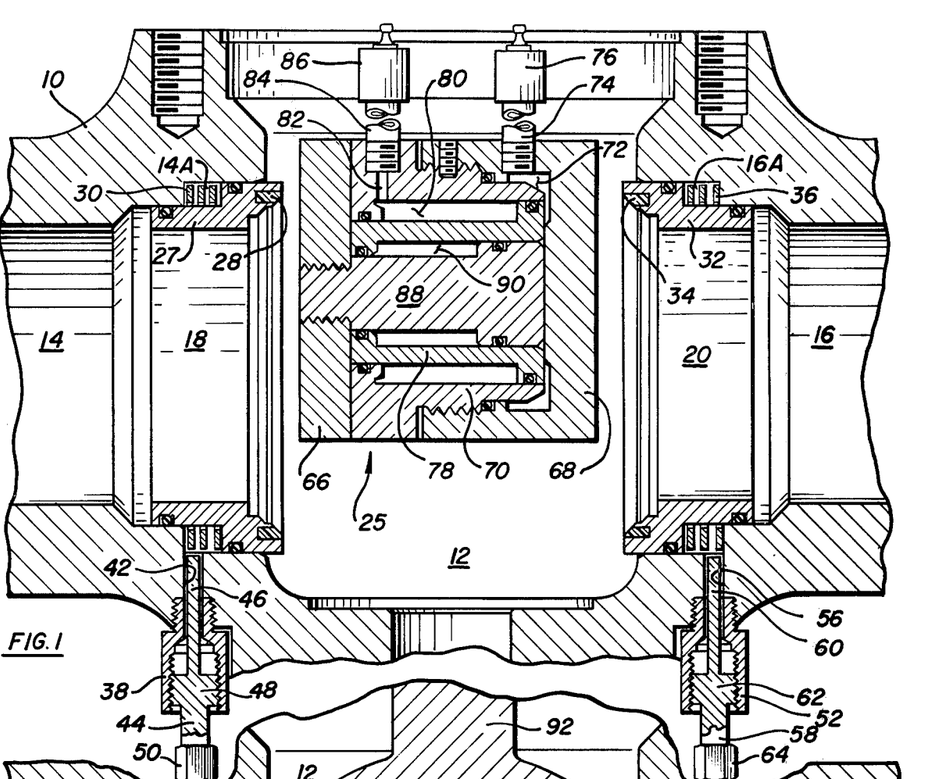
FIG. 1 is a cross-section view of a top entry ball valve with the seats located in the seat pockets, the seat retaining tools mounted in the seat lubricant fittings, and the longitudinally expandable member in an intermediate position in the valve body cavity located such that it will contact the seat members.

Referring now to FIG. 1 of the drawings which shows the valve in an initial stage of assembly. At this point in assembly of the valve both seat assemblies 18 and 20 are located in the respective seat pockets and the longitudinally expandable member 25 of the valve assembly tools is being lowered into position between the seat members.

Seat assembly 18 includes an annular seat member 27 with peripheral seals mounted therearound engaging the annulus of the seat pocket and a resilient face seal 28 for contacting the ball valve member 22. A plurality of wave springs 30 are located between a radially disposed surface of valve body 10 and a radially disposed surface of seat member 27 to urge the seat member toward the valve member. Seat assembly 20 is constructed similar to seat assembly 18. Seat assembly 20 has an annular seat member 32, a resilient face seal 34, and a plurality of wave springs 36.

The seat lubrication fittings 24 and 26 are the same and are each mounted in a radially disposed aperture through valve body 10 in alignment with a portion of each seat pocket in the portion which encloses the seat springs. The apertures in valve body 10 which are used by the seat retaining tools and as lubricant passageways are shown intersecting the seat pockets at a rear portion, however, it is to be noted they can intersect the seat pocket any place in the portion of the seat pockets which will be occupied by the seat springs when the seats are in the retracted position. These lubrication fittings are shown in the bottom portion of the valve body, however, it is to be understood that they can be mounted in a side or an upper portion of the valve body alternately if desired. Lubrication fitting 24 includes a hollow nipple or outer member 38. Outer member 38 is threaded on one end so that it can be threadedly mounted in the radially disposed aperture in valve body 10. Outer member 38 is internally threaded to receive a lubrication injector connection fitting 40 as shown in FIG. 5. The bore through outer member 38 aligns with an internal aperture 42 in valve body 10 which connects with the portion of seat pocket or seat assembly 18 that encloses seat springs 30. Internal threading of outer member 38 permits the mounting of a seat retaining tool or inner member 44. Seat retaining tool 44 includes an elongated rod or shaft portion 46 which is integrally connected with an enlarged threaded portion 48 on one end thereof which is in turn connected with a mechanical coupling 50 on the outer end thereof. Coupling 50 can be cross-sectional hexagonally shaped so a service person can rotate the seat retaining tool by using an ordinary wrench. Rotating seat retaining tool 44 relative to outer member 38 displaces the seat retaining tool in a telescopic motion. Lubrication fitting 26 is constructed similar to lubrication fitting 24 with an internally and externally threaded nipple or outer member 52. Outer member 52 is mounted in an aperture 56 in valve body 10 and normally mounts a lubricant injector connection fitting 54. Lubrication fitting outer member 52 threadedly telescopically mounts a second seat retaining tool. This seat retaining tool 58 is similar to one described above and includes an elongated rod or shaft portion 60 extending from an enlarged threaded portion 62 and having a mechanical coupling on a shaped outer end 64. The shaped outer end 64 can be cross-sectionally hexagonal in shape so a service person can rotate the seat retaining tool with a common wrench. Rotating inner member 58 displaces it in a telescopic action relative to outer member 52. Rotation of inner member 58 will cause the innermost end of the shaft 60 to contact the peripheral portion of seat springs 36.

It is to be noted that the lubrication fittings 24 and 26 which are shown can be removed and replaced by fittings that are directly threaded into the valve body without the nipple, at the desire of the user, without departing from the scope of this invention. In such a case the injection connection fittings 40 and 54 would mount directly in valve body 10 and would be removed to mount nipples or outer members 38 and 52 to support seat retaining tools 44 and 58.

Longitudinally expandable member 25 is provided with seat engaging members 66 and 68 on opposite ends thereof for engaging the opposing face end portions of seats 26 and 32. The piston and cylinder portion of longitudinally expandable member 24 includes an outer cylinder member 70 which has a seat engaging member 68 threadedly mounted over one end thereof. An outer cylinder chamber 72 is formed between outer cylinder 70 and the inner end portion of seat engaging member 68. It is to be noted that an annular recess around the interior of seat engaging member 68 forms outer cylinder chamber 72 around the end of outer cylinder member 70 as shown clearly in FIGS. 2 and 3. A hole is provided through the perimeter of seat engaging member 68 and a conduit 74 is mounted in the hole to provide for fluid communication between the exterior of the tool and outer cylinder chamber 72. A fluid coupling 76 is mounted on the exposed end of conduit 74 for connecting a fluid pressure source to the tool. An inner cylinder member 78 is slidably mounted in the annulus of outer cylinder 70 and provided with an outwardly extending enlargement at one end having a seal therearound. This enlargement has an abutment on one side which will engage an inwardly extending abutment on outer cylinder 70 to limit the extending motion of the cylinders relative to each other. An intermediate annularly shaped chamber 90 is defined between the outside of inner cylinder 78 and the interior of outer cylinder 70 and between the above described abutments. A fluid passageway 82 is provided through outer cylinder 70 from intermediate fluid chamber 80 to the exterior of the cylinder. A conduit 84 is mounted in fluid passageway 82 and extends from the tool. A fluid coupling 86 is mounted on the distill end of conduit 82 for connection with a fluid pressure source. A piston 88 is slidably mounted in the annulus of inner cylinder 78 within a piston chamber 90. Piston 88 is provided with a peripherally enlarged portion on the end which remains within inner cylinder member 78. The enlarged end portion has a radially disposed abutment which will contact an inwardly disposed radially oriented abutment in the end portion of inner cylinder member 78 to limit the extension movement of piston 88 relative to the inner cylinder. A fluid seal ring is provided around the enlarged end of piston 88 to seal it inside inner cylinder 78. Piston 88 is connected with seat engaging member 66 in a rigid fashion such as by a threaded connection.

Figure 2:
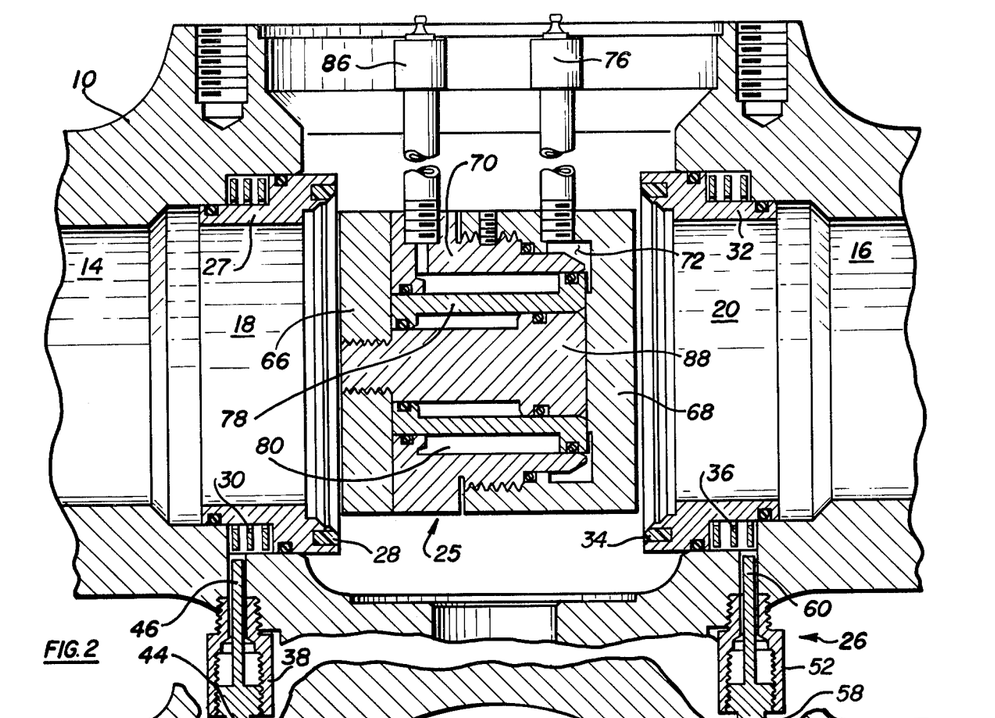
FIG. 2 is a cross-sectional elevation view of the valve and assembly tools shown in FIG. 1 with the longitudinally expandable member positioned in line with the seat members and the bore of the valve.

To use the valve assembly tool and the method of this invention, the seat assemblies 18 and 20 are first placed in the respective seat pockets in valve body 10. The seat retaining tools 44 and 58 are then mounted in outer members 38 and 52 and positioned as shown in FIG. 1 with the innermost end of the stingers or shafts 46 and 60 slightly spaced from the outer peripheral portions of seat springs 30 and 36 respectively. Next, as is shown in FIG. 2, longitudinally expandable member 25 is aligned with seat assemblies 18 and 20 such that the seat engaging members 66 and 68 will engage facing portions of the seat members when the tool is expanded. Expanding of the longitudinally expandable member 25 is done by connecting a fluid supply device to fluid connection 76 and injecting a fluid under pressure into outer cylinder chamber 72. Injection of fluid into outer cylinder chamber 72 urges piston 88 along with inner cylinder member 78 to the left from the position shown in FIG. 2. It is to be noted that once the outwardly extending radial abutment of inner cylinder 78 contacts the inwardly extending radial abutment of outer cylinder 70, then additional expansion of the tool is done by piston 88 moving inside inner cylinder 78. The motion of piston 88 inside inner cylinder 78 adds to the telescopic expansion of this tool and enables one tool to expand sufficiently for use in several sizes of valves.

Figure 3:
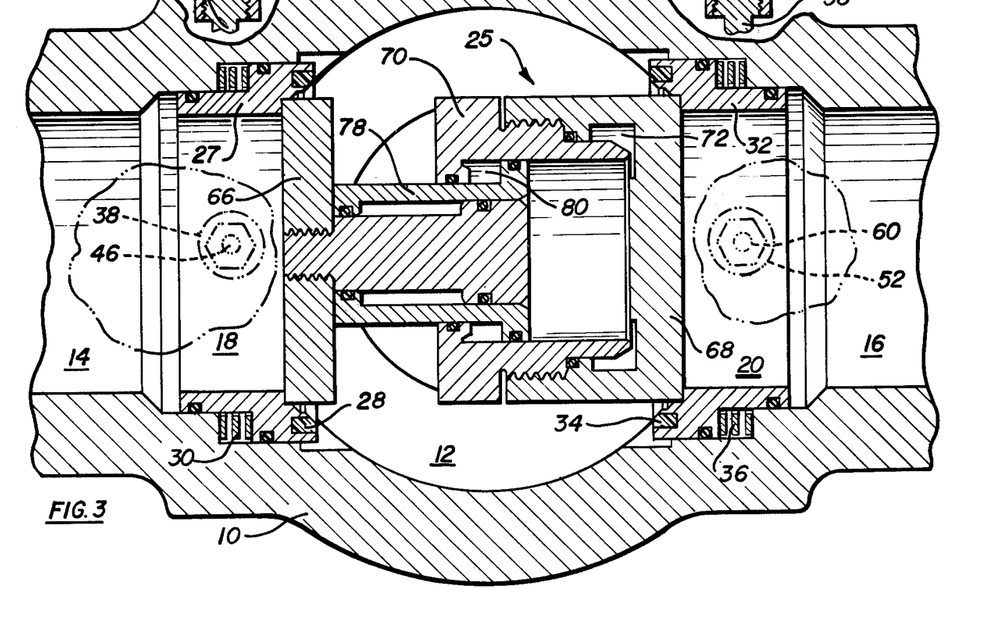
FIG. 3 is a cross-sectional view of the valve and assembly tools shown in FIGS. 1 and 2 with the view taken from a transverse position showing the longitudinally expandable member in an extended position with the seat members in the retracted position in their respective recesses or seat pockets.

When the longitudinally extendable member 25 is extended, it assumes a position as shown in FIG. 3 with the end portions of the seat engaging members 66 and 68 contacting face portions of seat members 27 and 32. Further expansion of this tool displaces seat members 27 and 32 outwardly into their respective seat pockets thereby compressing springs 30 and 36 respectively. When seat members 27 and 32 are displaced to a sufficiently retracted position which will allow the entrance of ball valve member 22, then expansion of the tool 25 is stopped. The specific position at which ball valve member 22 can be placed between the seat members obviously depends on the diameter of the ball member and other dimensions in the valve. When this retracted position is reached, the seat retaining tools 44 and 58 are rotated to extend the shaft portions thereof 46 and 60 inwardly to engage peripheral portions of springs 30 and 36 and urge them radially inward into frictional contact with the outer perimeter of the respective seat members. Both of the seat retaining tools function similarly by forcibly retaining seat springs 30 and 36 against outer peripheral portions of the valve seat members 27 and 32 in a frictional contact thereby preventing movement of the seat members due to the bias of seat springs 30 and 36. It is to be noted that obviously if the ends of shaft portions 46 and 60 do not contact the springs on their perimeter they can continue and frictionally engage the perimeter of the seat members and also temporarily hold the seat members.

When the seat members have been secured in the retracted position, then longitudinally expandable member 25 is contracted by releasing fluid pressure from outer cylinder chamber 72 and applying fluid pressure to intermediate chamber 80 through fluid coupling 86, conduit 84, and passageway 82. The application of fluid pressure to intermediate chamber 80 will displace inner cylinder member 78 to the right from the position shown in FIG. 3 thereby contracting longitudinally expandable member 25. In the instance where piston 86 is extended from inner cylinder member 78, then piston 88 will not be retracted into inner cylinder 78 by the application of fluid pressure to intermediate chamber 80. Piston 86 must be retracted into inner cylinder 78 by manual compression of the tool. Longitudinally expandable member 25 can be retracted sufficiently to permit its removal from the valve body cavity and additional retraction can be done manually after removal.

Figure 4:
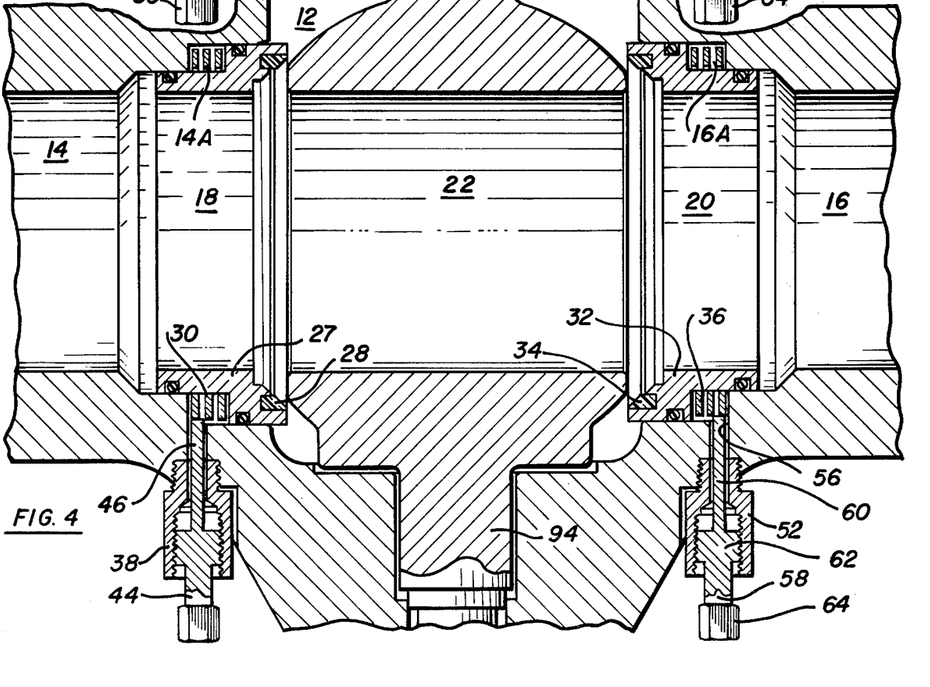
FIG. 4 is a cross-sectional view of the valve as shown in FIG. 1 with the seats retained in a retracted position by the seat retaining tools and with the ball valve member positioned in the valve body cavity.

Next, in assembly of the valve the ball valve member 22 is inserted into valve body cavity 12 and located in its final resting position between the seat assemblies 18 and 20. Spherical valve member 22 is provided with a stem 92 extending above the spherical portion of the member and a shaft 94 extending downward from the spherical portion of the valve member into a journal 96 in the lower portion of valve body 10. Upper stem 92 extends through the bonnet and another bearing (not shown) which rigidly supports the spherical valve about the axis defined by stem 92 and journal 94 when the valve is completely assembled. Once ball valve member 22 is positioned in valve body 12, then seat retaining tools 44 and 58 are rotated to retract the respective shaft portions thereof from springs 30 and 36 thereby releasing the frictional retention of seat members 27 and 32. When the seats are released, seat springs 30 and 36 urge them toward the valve member to allow seal rings 28 and 34 to contact the spherical surface of the valve member. Seat retaining tools 44 and 58 are then removed from the lubrication fittings and replaced by lubricant injector connections 40 and 54. At this point the valve is substantially assembled and all that remains to be done is installation of the bonnet to complete the valve.

Figure 6:
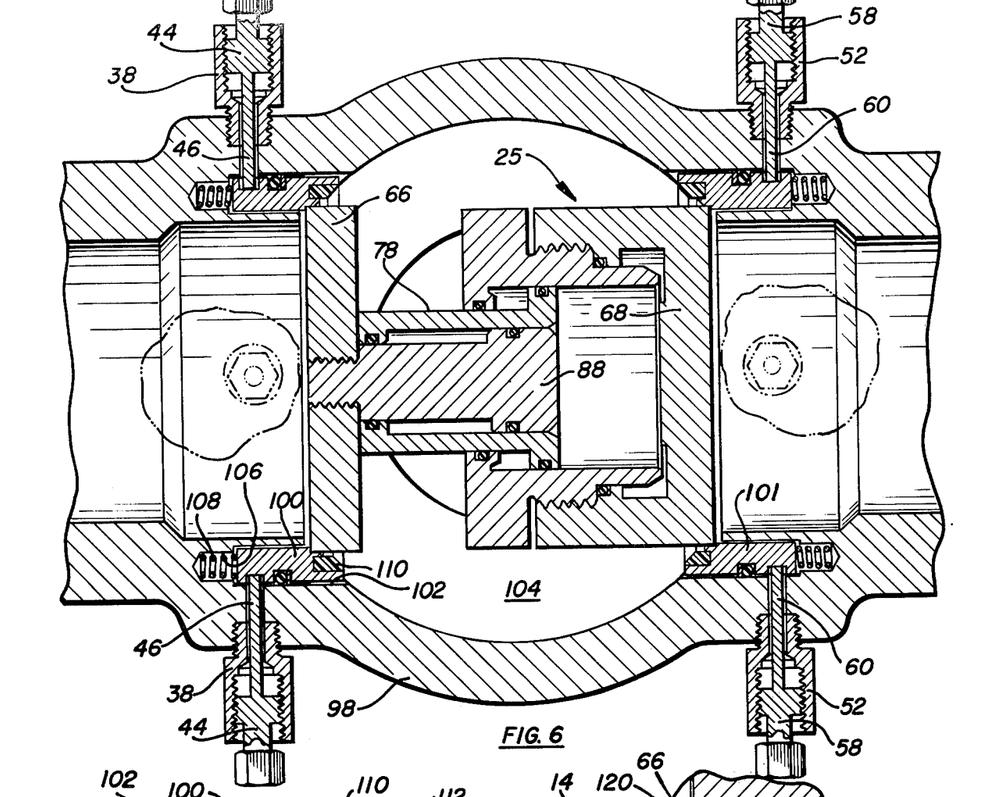
FIG. 6 is a transversely taken cross-sectional view of a valve employing an alternate seat construction and utilizing the seat assembly tools of this invention.
Figures 7, 8, 9:
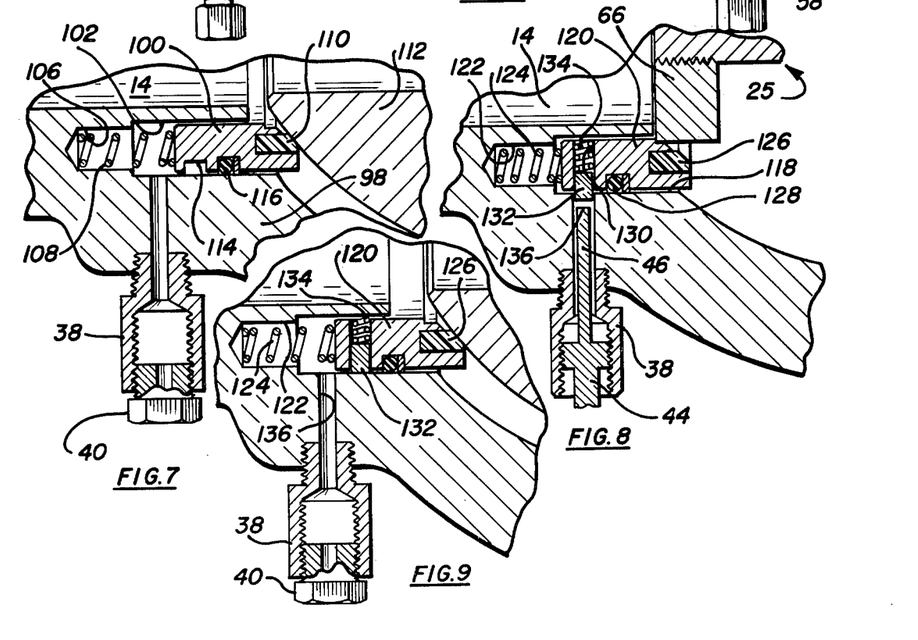
FIG. 7 is a cross-sectional view of a fragment of the valve shown in FIG. 6 illustrating the seat construction in detail in the assembled position with the lubricant injector coupling mounted in the seat lubrication fitting.
FIG. 8 is a fragmentary cross-sectional view of a valve having another alternate seat construction and utilizing the seat installation tools of this invention wherein the seat is provided with an internally carried spring urged latching pin.
FIG. 9 is a fragmentary view of the seat construction shown in FIG. 8 illustrating the seat in the assembled condition with the lubricant injector coupling attached to the seat lubrication fitting.

FIGS. 6 and 7 show another embodiment of a valve which utilizes the valve installation device of this invention. The valve shown in FIGS. 6 and 7 is substantially the same as the one described above except it has the seat pocket portion of the valve body 98 shaped to accept an annular seat member 100 in a seat pocket 102 formed with an internal wall between the annulus of the seat member and the bore of the inlet and outlet passageways. Seat pocket 102 opens on one end to the valve body cavity 104 and has a plurality of apertures 106 in the closed end portion thereof to receive and hold a plurality of seat springs 108. Seat springs 108 contact one end of seat member 100 and urge it in the direction of the valve member. FIG. 7 shows this seat construction in an enlarged detail. Seat member 100 is provided with a face seal 110 mounted in the end portion thereof which contacts valve member 112. The rear portion of seat member 100 is provided with a cross-sectionally rectangular groove 114 around the outer perimeter thereof. An O-ring 116 is mounted in another groove around the outside of a mid-section of seat member 100 for sealing around the inside of seat pocket 106. A seat lubricating passageway is provided through valve body 98 from a lubrication fitting 38 on the exterior of the valve body directly to seat pocket 106. This passageway is disposed radially relative to the seat axis and located in a position such that it will align with peripheral seat groove 114 when seat 100 is in a retracted position.

In this particular valve construction, the valve assembling device of this invention is used the same as described above with the only difference being that the shaft or stinger portion of seat retaining tool 44 is engaged in the seat peripheral groove 114 when the seat is in the completely retracted position. By engaging the seat retaining tool in groove 114, the seat is retained by a locking action rather than friction. FIG. 6 shows the seat retaining tools engaged with the seat members 100 and 101 and the longitudinally expandable member 25 is in an expanded position.

FIG. 8 shows still one further embodiment of a seat construction which can utilize valve assembly tools of this invention. In this construction the seat pocket is formed as described immediately above with an enlarged portion 118 to mount seat member 120 and a plurality of apertures 122 to mount seat springs 124. In this construction seat member 120 has a face seal 126 and an outer peripheral O-ring 128 similar to that described above. In the rear portion of seat member 120, a transversely oriented aperture 130 is provided to enclose a locking pin 132 and a spring 134. Locking pin 132 is on the outer peripheral portion of seat member 120 and extendable into a passageway 136 in the valve body when seat member 120 is in the retracted position. Passageway 136 is a seat lubricant passageway joining the seat pocket and a seat lubrication fitting 38 mounted on the interior of the valve similar to the passageways described above. In this construction the longitudinally expandable member 25 displaces seat member 120 into the retracted position at which time locking pin 132 is urged radially outwardly by spring 134 into passageway 136. Then longitudinally expandable member 124 is removed from the valve body and seat member 120 remains in the retracted position because of the locking action of locking pin 132. When the ball valve member has been placed in the valve body then the seat retaining tool is utilized to release locking pin 132 by moving the stinger or shaft portion thereof inwardly to contact locking pin 132 and displace its outer end from passageway 136 so locking pin 132 is completely enclosed in seat pocket 118. When locking pin 132 moves out of passageway 136, then seat spring 124 urge seat member 120 into contact with the valve member. FIG. 9 shows a fragmental view of this valve seat construction in the completed condition with the seat lubrication injector fitting installed. The locking pin and seat construction shown in FIGS. 8 and 9 employ an aperture completely radially transversing the seat member. It is to be understood this passageway can be a blind aperture opening only to the outside of the seat member if desired without departing from the scope of this invention.

FIG. 10 illustrates an alternate embodiment of the longitudinally expandable member of the valve assembly tools of this invention which employs a mechanical linkage to expand. This longitudinally expandable member has a pair of seat engaging members 138 and 140 pivotally connected to two sets of linkage arms 142 and 144. Each set of linkage arms includes two (2) pairs of arms with one pair pivotally mounted on opposite sides of support blocks 146 and 148 and seat engaging members 138 and 140. Support blocks 146 and 148 are mounted in spaced relation on an elongated threaded member 150. The elongated threaded member is oppositely threaded on the opposed end portions thereof so that rotation of the threaded member in one direction will cause an opposite and uniform displacing motion of the block members 146 and 148. One end of the threaded member is provided with a coupling 152 so that a service person can rotate the threaded member by using a common wrench.

FIG. 11 illustrates a further embodiment of an alternate longitudinally expandable member of the valve assembly tools of this invention. This longitudinal expandable member has a pair of seat engaging members 154 and 156 mounted on opposite ends of a longitudinally extendable flexible membrane structure or bladder. The bladder can be comprised of a pair of longitudinally extendable accordian like sections 158 and 160 adjoining seat engaging members 154 and 156 respectively and including a central portion 162. Fluid under pressure is introduced into the interior of this bladder by a fluid coupling 164. When fluid is introduced into the bladder, the accordian sections 158 and 160 are so shaped to extend the length of this tool so the seat engageable members 154 and 156 will be separated. Contraction of this longitudinally expandable member is accomplished by release of fluid from the bladder through fluid coupling 164.

FIG. 12 illustrates still one further embodiment of the longitudinally expandable device of the valve assembly tools of this invention with such being a lever actuated device. This longitudinally expandable device has a pair of seat engaging members 166 and 168 which are pivotally mounted with a pair of levers 170 and 172. Levers 170 and 172 are joined at a common pivot point at a mid-portion thereof and extend in opposite directions from the pivot point. Displacing the levers apart by hand moves the seat engaging members 166 and 168 apart and moving the levers together moves the seat engaging members closer together. This embodiment of the longitudinally expandable device requires no external actuating power source for operation. A latch assembly can be provided to secure the levers in a fixed position once they have been positioned to retract the seat members. One such latch assembly is shown which includes a toothed member 176 that is pivotally mounted on one lever and engages a pin 178 on the other lever.

As shown and described by the above, the unique valve assembly tools and method of assembly of this invention provide something that is usable in valve manufacture as well as usable in a field service environment. The tools take advantage of the lubricatable seat design of the valve to provide an easy and safe device to use in assembling a top entry style ball valve. The method of assembly relies on the unique lubricating provisions of the valve to expedite assembly and provide for temporarily retaining the seats during insertion of the ball valve member.

What is claimed is:

1. A method of assembling a ball valve having a valve body with inlet and outlet passageways therethrough, seat mounting recesses at inner ends thereof joining a centrally disposed valve chamber which opens to one side of said valve body for insertion of a spherical valve member into said valve chamber, said valve body having auxiliary seat lubrication openings through said valve body to said seat mounting recesses, and said valve including seat assemblies which are normally resiliently urged toward the spherical valve member, said method comprising the following steps of:
   (a) inserting seat assemblies into said seat mounting recesses;
   (b) inserting an expandable seat displacement tool between said seat assemblies, said tool being capable of expanding between said seat assemblies into simultaneous engagement with both seat assemblies;
   (c) expanding said seat displacement tool between said seat assemblies into simultaneous engagement with each seat assembly to simultaneously displace said seat assemblies (note that this change has been effected in preliminary amendment) to a retracted position such that said seat assemblies are sufficiently separated to permit insertion of said spherical valve member between said seat assemblies;
   (d) inserting a seat retaining tool through each of said auxiliary seat lubrication openings to temporarily secure said seat assemblies in said retracted position;
   (e) contracting said seat displacement tool sufficiently to allow its removal from said valve body;
   (f) removing said seat displacement tool from said valve body;
   (g) inserting said spherical valve member into said valve chamber between said seat assemblies;
   (h) releasing said seat retaining tools thereby permitting said seat assemblies to move into contact with said spherical valve member; and
   (i) removing said seat retaining tools from said valve body.

2. The method of claim 1, wherein said step of inserting the seat retaining tools includes engaging each of said seat retaining tools with a peripheral portion of said seat assemblies.

3. The method of claim 1, wherein said step of inserting the seat retaining tools includes;
   (a) mounting each of said seat retaining tools in said valve body through said auxiliary seat lubrication openings, and
   (b) actuating each of said seat retaining tools individually to extend a stinger portion to engage an inner peripheral portion of each of said seat assemblies.

4. The method of claim 1, wherein said ball valve includes a pair of wave springs in the valve body encircling portions of the respective seat assemblies and acting to resiliently urge said seat assemblies toward the valve member, said step of inserting a seat retaining tool comprising:
   engaging each of said wave springs with a portion of the seat retaining tool in a manner to firmly press said wave springs against said portions of the respective seat assemblies to frictionally secure each of said seat assemblies temporarily in said retracted position thereof.

5. A valve assembly device for installing a pair of seat assemblies and a valve member in a valve, comprising:
   (a) piston and cylinder apparatus having seat face engaging members on opposite ends thereof engagable with facing end portions of said seat assemblies, said piston and cylinder apparatus being longitudinally extendable in a telescopic fashion to displace a pair of seat members into a retracted position in a pair of seat pockets of said valve;
   (b) said piston and cylinder apparatus has an outer cylinder which encloses an inner cylinder that in turn encloses a piston, said piston and said inner cylinder being extendable from said outer cylinder upon application of fluid to the interior of said outer cylinder, said piston being extendable from said inner cylinder when said inner cylinder reaches its maximum limit of travel from said outer cylinder;
   (c) a pair of seat retaining tools temporarily mountable in said valve body through seat lubricant fittings of said valve body which connect the seat pockets with the exterior of said valve, said seat retaining tools being engagable with said seat assemblies to temporarily secure said seat members in a fixed and retracted position;
   (d) said seat retaining tools each having an outer member mountable in said lubricant fittings and an inner member threadedly mounted in the outer member and including an elongated stinger on one end thereof for engagement with said seat members and a gripping portion on the opposite end thereof for engagement with a hand tool or the like for rotation of said inner member in said outer member.

6. A valve assembly device for installing a pair of seat assemblies and a valve member in a valve, comprising:

a longitudinally expandable member having seat engaging surfaces on opposite ends thereof to contact faces of said seat assemblies in a manner to move said seat assemblies into retracted positions in seat pockets therefor against the bias of resilient portions of the seat assemblies, said longitudinally expandable member having a fluid actuated piston and associated cylinder with one end of said cylinder secured to one of said seat engaging surfaces and one end of said piston secured to the other seat engaging surface; and a pair of seat retaining tools temporarily mountable in said valve body through seat lubricant fittings of said valve which connect the seat pockets with the exterior of the valve, each seat retaining tool including an outer member threadedly mountable in said seat lubricant fitting and an inner member threadedly mounted in said outer member to effect telescoping motion upon rotation of said inner member to thereby engage said inner member with the corresponding seat assembly in a manner to temporarily secure said seat assemblies in their retracted positions.

7. A valve assembly device for installing a pair of seat assemblies and a valve member in a valve, comprising:
(a) a piston and cylinder apparatus which is longitudinally expandable to engage facing end portions of said seat assemblies in a manner to displace the latter into retracted positions in seat pockets against the bias of resilient portions of the seat assemblies, said piston and cylinder apparatus including:
(1) an outer cylinder having a closed end carrying a seat engaging member for contacting one of said seat assemblies;
(2) an inner cylinder slidably received in said outer cylinder and extensible relative thereto;
(3) a piston slidably received in said inner cylinder and extensible relative thereto and having an exposed end carrying a seat engaging member for contacting the other of said seat assemblies;
(4) a fluid chamber between the closed end of said outer cylinder and inner end portions of said inner cylinder and piston, whereby pressurization of said fluid chamber causes said inner cylinder and said piston to be extended together from the outer cylinder with said piston being extensible from said inner cylinder when said inner cylinder reaches a maximum extended position;
(5) a passageway extending in said outer cylinder to said fluid chamber to deliver fluid thereto;
(6) an annular chamber between said inner and outer cylinders at a location to receive pressurized fluid to retract said inner cylinder into said outer cylinder when the pressure in said annular chamber exceeds that in the first mentioned fluid chamber; and
(7) a passageway in said outer cylinder leading to said annular chamber to deliver fluid thereto; and (b) a pair of seat retaining tools temporarily mountable in said valve through seat lubricant fittings of the valve which connect the seat pockets with the exterior of the valve, each seat retaining tool being a telescopic assembly having an outer member rigidly mountable with the corresponding lubricant fitting and an inner member extendable from the outer member and engageable with the corresponding seat assembly to temporarily secure the same in its retracted position.

8. A method of assembling a valve having a valve body presenting an inlet passage and an outlet passage with a valve chamber therebetween, an opening extending to said valve chamber from the exterior of the valve body, a pair of seat mounting recesses adjacent said valve chamber for receiving seat members which are yieldably urged toward the valve chamber, and a valve member adapted to be inserted through said opening into the valve chamber, said method comprising the steps of:

inserting the seat members into the respective recesses;
providing a tool capable of moving between an extended position wherein the tool is sized to extend between the seat members in simultaneous engagement with each seat member, and a contracted position wherein the tool is sized to pass through said opening into the valve chamber;
inserting said tool through said opening and into said valve chamber with the tool in its contracted position;
extending said tool to its extended position to simultaneously engage both seat members with the tool in a manner to move said seat members apart to retracted positions wherein the seat members are separated sufficiently to permit insertion of said valve member therebetween;
contracting said tool to its contracted position within the valve chamber while holding said seat members in their retracted positions;
withdrawing said tool through said opening with the tool in its contracted position while holding said seat members in their retracted positions;
inserting said valve member through said opening into the valve chamber while holding said seat members in their retracted positions; and
releasing said seat members from their retracted positions to permit movement thereof toward one another into contact with the valve member.

9. A valve assembly device for use in installing a valve member in a valve body having inlet and outlet flow passages with a valve chamber therebetween, an opening extending to said valve chamber from the exterior of said body and of sufficient size to permit passage of said valve member therethrough into the valve chamber, a pair of spaced apart seat mounting recesses adjacent said valve chamber, and a pair of seat members in the respective recesses which are normally urged resiliently toward the valve chamber, said device comprising:

a longitudinally expandable member movable between a contracted position wherein said expandable member is small enough to pass through said opening into said valve chamber, and an extended position wherein said expandable member is of sufficient length to span the valve chamber with opposite ends of said expandable member in simultaneous contact with the seat members;

seat engaging members on the opposite ends of said expandable member engageable with said seat members when said expandable member is in the extended position to push said seat members away from one another for enough to permit insertion of said valve member therebetween; and means for effecting movement of said expandable member from the contracted position to the extended position from a location exteriorly of the valve body while said expandable member is located in the valve chamber.

10. A device as set forth in claim 9, including means for holding said seat members out of the valve chamber after removal of said seat engaging members from contact with said seat members.

11. A device as set forth in claim 9, wherein said longitudinally expandable member comprises:

an outer cylinder having a closed end on which one of said seat engaging members is carried;

an inner cylinder slidably received in said outer cylinder and extensible relative thereto to a maximum extended position;

a piston slidably received in said inner cylinder in a manner to extend relative thereto, said piston having an outer end on which the other of said seat engaging members is carried;

a first chamber between the closed end of said outer cylinder and inner ends of said inner cylinder and piston to effect extension of said inner cylinder and said piston together upon pressurization of said first chamber, said piston being extensible from said inner cylinder after the latter reaches its maximum extended position;

a second chamber between said inner and outer cylinders for receiving pressurized fluid to effect retraction of said inner cylinder into said outer cylinder; and passages leading to said first and second chambers for delivering fluid thereto.

* * * * *